Patented Aug. 3, 1937

2,088,810

UNITED STATES PATENT OFFICE 2,088,810

CRUMB MAKING DEVICE

Claude E. Quick, Glendale, Calif., assignor to Western Bakeries Corporation, Ltd., Los Angeles, Calif., a corporation of California Application August 14, 1936, Serial No. 95,997

3 Claims. (Cl. 146—174)

This invention relates to a crumb-making device more particularly for use in bakeries for comminuting dry bread, sweet rolls, dougnuts, cakes, cookies and other bakery products for the purpose of utilizing otherwise unused products by forming crumbs from them to be used, for example, for coating other bakery products, or as an ingredient in making other bakery goods.

The invention aims to provide an improved device for this purpose and particularly a machine that will take semi-dry material containing grease, icing, or moisture which cannot be economically removed from the material and which by means of my invention can be reduced to a useful condition. Furthermore, a machine embodying my invention is substantially self-cleaning and requires a minimum of attention and operative skill. To this end the material desirably moves through the machine under the influence largely of gravity.

Figure 1:
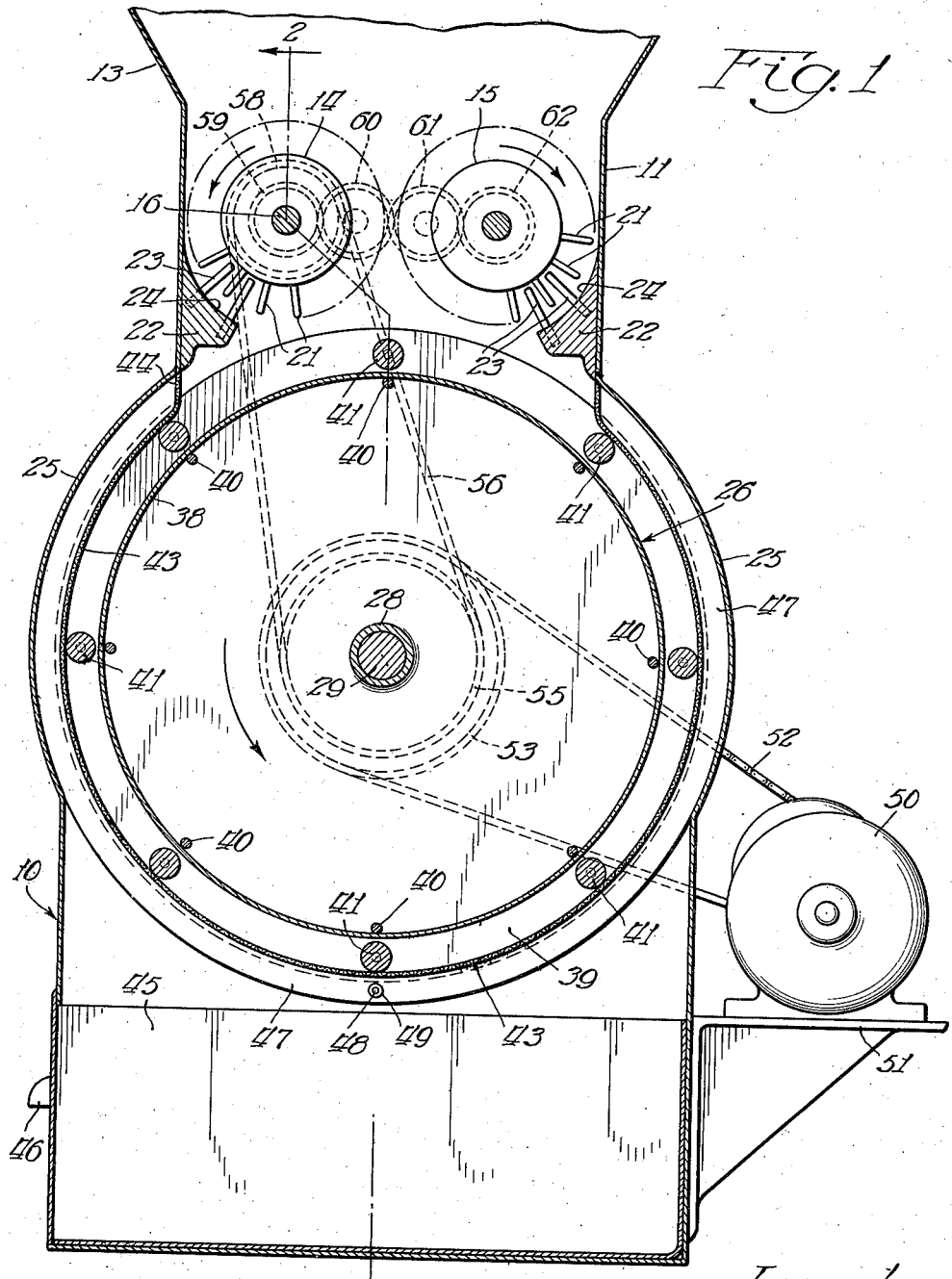
Figure 2:
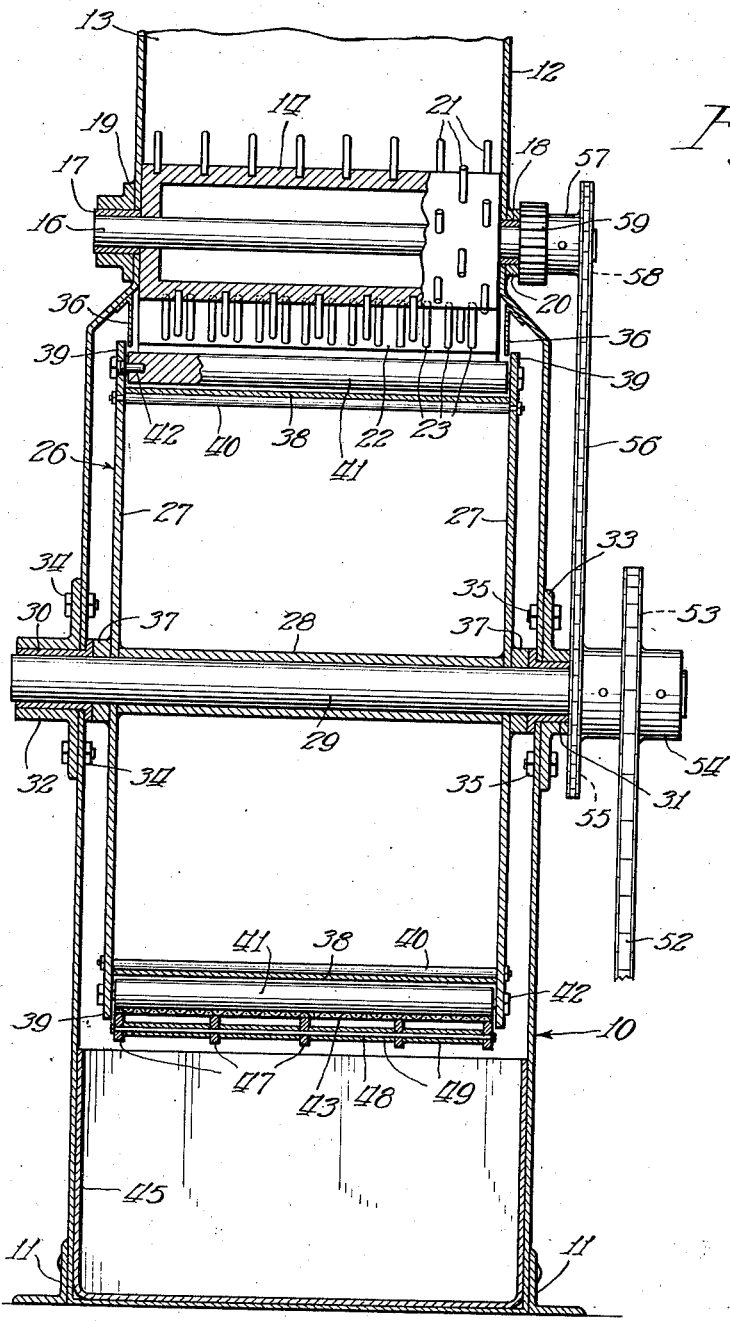

Other objects and advantages will be apparent from the following description taken together with the accompanying drawings in which:

Figure 1 is a vertical view partially in section illustrating the herein described embodiment of my invention; and Figure 2 is a cross-section taken on the line 2—2 of Fig. 1.

Referring in detail to the illustrative construction shown in the drawings, the housing 10 may be advantageously constructed of sheet metal or the like and may be between, say, three and four feet in height. Angle braces 11 may secure the housing and with it the machine as a whole to the floor or the like.

Near its upper end the housing 10 is desirably contracted as at 11 in the direction of its length as shown in Figure 1, and also of its width as shown at 12 in Figure 2; and thereabove, as partially indicated at 13, the housing is flared outwardly to form a hopper to receive the goods to be reduced to crumbs.

Within its reduced portion 11—12 the housing carries means for breaking up the goods to smaller pieces than those originally deposited in the hopper, as an intermediate step in the comminuting process. In this instance the two oppositely rotating mangling cylinders 14 and 15 are mounted in the reduced housing portion 11—12. As shown in Figure 2 with respect to cylinder 14, each cylinder may be mounted on a shaft 16 rotatable in bearings 17—18 carried by the housing walls reinforced by bearing collars 19 and 20 at each end of the shaft respectively.

The cylinders 14 and 15 each carry throughout their effective peripheries a multiplicity of pins or fingers 21 suitably spaced apart, at say distances of one inch, or one and one-quarter inches, and projecting radially from the cylinder. These fingers 21 are desirably staggered or disposed in helical spiral arrangement as best shown in Figure 2, as it has been found that the fingers will be self-cleaning and will avoid clogging of the cylinders as so arranged.

Beneath each of the rollers 14 and 15, one at each end of the housing portion 11—12, is a comb member 22 having fingers 23 similar to the fingers 21 on the cylinders. The fingers 23 are fixed by reason of the combs being fixed to the housing and are arranged to be intercalated with the movable fingers 21 on the cylinders; that is, these fingers are staggered so that the cylinders may rotate in the vicinity of the combs and material dropped into the hopper 13 will flow or be forced by the rotation of the cylinders between the fixed and movable fingers and will thus be broken up into smaller portions. The combs 22 desirably present arcuate surfaces 24 to the cylinders to enhance this action and so that more than one row of fingers may be carried by each comb to enhance this breaking-up action.

Below the cylinders 14 and 15 the housing 10 is desirably enlarged in the direction of its length as indicated at 25, these enlarged portions being of arcuate formation to accomodate a rotatable drum 26 which is desirably about twelve inches wide and eighteen inches in diameter, in a preferred form here specifically referred to. The drum 26 is here shown as constructed of two disklike end plates 27 welded or otherwise secured to a tubular spacer member 28 and mounted on an axle 29 which is journaled in bushings 30 and 31 carried by the walls of the housing 10 reinforced by the bearing collars 32 and 33 secured to the walls respectively as by bolts 34 and 35. As shown in Figure 2, the drum 26 is slightly wider than the effective peripheral lengths of the cylinders 14 and 15 so that the material mangled by the cylinders between the cylinders and the combs 22 may be received on the periphery of the drum, which periphery is imperforate. To further direct the material to the periphery of the drum, guide plates 36 may be secured to the inner faces of the housing walls below and at the ends of the combs 22. To permit the drum to turn freely within the housing and at the same time to center the drum beneath the mangling cylinders, spacing collars 37 may be interposed between the end plates 27 and the bearing bushings 30.

In accordance with my invention the end plates 27 are continued beyond the periphery 38 of the drum to form flanges 39 at each end thereof. The end plates 27 may be tied together in the vicinity of the peripheral wall 38 of the drum by tie rods 40. Uniformly spaced about the periphery of the drum 26 and carried by the flanges 39, I have shown a series of rollers 41 which are free to turn with respect to the drum as by being freely mounted on screw pins 42 carried by the flanges 39.

Disposed about the peripheral wall 38 of the drum and also between the flanges 39, I have shown a flexible wire screen 43, which, however, is discontinued immediately beneath the cylinders 14—15 as by having its ends 44 welded or otherwise secured to the housing wall to provide an opening which permits the material from the cylinders to drop onto the drum. Thereafter, the rotation of the drum causes the mangled material deposited to be moved into the space between the drum and screen, and the rollers 41 pulverize or comminute the material and force it through the screen 43 whereupon it drops into the receptacle 45 which may be in the form of a drawer in the bottom of the housing, having a handle 46.

The screen 43 is somewhat floating being maintained in substantially fixed position by being pressed between the rollers 41 and a series of axially spaced apart partially circular bars 47 which are secured to the arcuate walls 25 of the housing. The tie rod 48, intermediate of the walls 25, with interposed spacers 49 hold the bars 47 in their proper relationship. The degree of fineness of the comminuted material may be determined by the mesh employed for the screen 43, since the rollers 41 will continue to pulverize the material against the screen until it is reduced to sufficient fineness to pass through the screen, and thus also keep the screen clean.

It will be noted that the floating portion of the screen conforms to the periphery of the drum throughout its floating area, that is, with the exception of the ends of the screen which are secured as at 44, and further, that the extent of the drum periphery which is not conformed to by the screen, that is, the portion between the combs 22, is of less extent arcuately of the drum than the diameter of the drum. It will be noted that in this instance the arcuate peripheral extent of the drum which is not occupied by the screen is approximately no greater than a radius of the drum so that the drum is very nearly completely surrounded, increasing the effective adjacent areas of the drum and screen to enhance the efficiency of the device.

The unitary device may include a motor reducer 50 mounted on a bracket 51 carried by the housing and having a drive chain 52 driving a sprocket 53 on the hub 54 which is keyed to the drum axle 29. This hub also carries a sprocket 55 which drives the chain 56. A hub 57 keyed to the cylinder shaft 16 has a sprocket 58 by which it is driven by the chain 56. The hub 57 may also carry a gear 59 which meshes with gear 60, the latter meshing with the gear 61 which in turn engages a gear 62 keyed to the shaft of the other cylinder 15. Thus both cylinders and the drum are all driven by the motor 50. Since the gears 59, 60, 61 and 62 are of the same size, both of the cylinders will be driven at the same speed and the drive is arranged so that the cylinders turn with their non-adjacent surfaces moving downwardly toward the combs 22.

Obviously the invention is not limited to details of construction shown for purposes of illustration. Furthermore it is not essential that all features of the invention be used conjointly as various combinations and sub-combinations may be advantageously employed.

Having described my invention, I claim:

1. In a crumb-making machine, the combination with a hopper and mangling device, of a pulverizing device comprising a rotatable drum, radially extending flanges on said drum, rotatable rollers carried by said flanges, arcuate spaced-apart stationary bars partially surrounding the drum, and a flexible wire screen secured at each end to the machine and intermediately floating between said bars and said drum and pressed upon by said rollers.

2. The structure of claim 1 wherein the flanges of the drum overlap the screen.

3. The structure of claim 1 wherein the screen conforms throughout its floating area to the periphery of the drum and is throughout said area contacted by the rollers and the portion of the drum periphery which is not conformed to by the screen is of less extent arcuately of the drum than the diameter of the drum.

CLAUDE E. QUICK.